US012670198B2

(12) United States Patent
Hranj et al.

(10) Patent No.: US 12,670,198 B2
(45) Date of Patent: Jun. 30, 2026

(54) TEXTUAL SUMMARIES IN INFORMATION SYSTEMS BASED ON PERSONALIZED PRIOR KNOWLEDGE

(71) Applicant: Microsoft Technology Licensing, LLC, Redmond, WA (US)

(72) Inventors: Zoran Hranj, Oslo (NO); Amund Tveit, Trondheim (NO); Kateryna Solonko, Oslo (NO); Aleksander Øhrn, Oslo (NO); Roman Werpachowski, Arneberg (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/174,764

(22) Filed: Feb. 27, 2023

(65) Prior Publication Data

US 2024/0289366 A1 Aug. 29, 2024

(51) Int. Cl.
*G06F 16/34* (2025.01)
*G06F 40/30* (2020.01)
*G06N 5/02* (2023.01)

(52) U.S. Cl.
CPC ............ *G06F 16/345* (2019.01); *G06F 40/30* (2020.01); *G06N 5/02* (2013.01)

(58) Field of Classification Search
CPC .......... G06F 16/345; G06F 40/30; G06N 5/02
USPC .......................................................... 715/254
See application file for complete search history.

(56) References Cited

U.S. PATENT DOCUMENTS

| | | | | |
|---|---|---|---|---|
| 5,918,236 A * | 6/1999 | Wical | .................... | G06F 40/253 |
| | | | | 707/999.005 |
| 6,205,456 B1 * | 3/2001 | Nakao | .................... | G06F 16/345 |
| | | | | 715/201 |
| 6,675,159 B1 * | 1/2004 | Lin | ........................ | G06F 40/205 |
| 7,466,334 B1 * | 12/2008 | Baba | .................... | G11B 27/034 |
| | | | | 348/E7.083 |
| 7,509,572 B1 * | 3/2009 | Melander | .............. | G06F 40/143 |
| | | | | 707/999.1 |
| 7,571,177 B2 | 8/2009 | Damle | | |
| 10,977,258 B1 * | 4/2021 | Liu | ........................ | G06F 40/274 |

(Continued)

OTHER PUBLICATIONS

R. Móro and M. Bielikov', "Personalized Text Summarization Based on Important Terms Identification," 2012 23rd International Workshop on Database and Expert Systems Applications, Vienna, Austria, 2012, pp. 131-135. (Year: 2012).*

(Continued)

*Primary Examiner* — Jeremy L Stanley

(57) ABSTRACT

Examples of the present disclosure describe systems and methods for providing textual summaries based on personalized prior knowledge. In examples, a user request for a summary of document or an entity is received. The document or documents associated with the entity are separated into segments and semantic embeddings are created for each segment. The semantic embeddings, a context of the user request, and relevant information available in the requesting user's previous knowledge base are provided as input to a personal knowledge system. Based on the input, the personal knowledge system outputs an indication of the segments that should be summarized. The indicated segments are provided to a summarization system. The summarization system generates a document summary or an entity summary and provides the summary to the user.

20 Claims, 5 Drawing Sheets

(56) References Cited

U.S. PATENT DOCUMENTS

| | | | | |
|---|---|---|---|---|
| 11,017,156 | B2 | 5/2021 | Hwang | |
| 11,188,584 | B1 | 11/2021 | Allen | |
| 11,328,732 | B2 | 5/2022 | Hou et al. | |
| 11,699,027 | B1 * | 7/2023 | Wu | G06F 40/56 |
| | | | | 715/254 |
| 11,721,093 | B2 * | 8/2023 | Liu | G10L 15/16 |
| | | | | 707/734 |
| 12,014,808 | B2 * | 6/2024 | Amarasingham | G16H 15/00 |
| 2005/0278314 | A1 * | 12/2005 | Buchheit | G06F 16/9577 |
| 2012/0166940 | A1 * | 6/2012 | Ennis | G06F 40/106 |
| | | | | 715/255 |
| 2012/0197630 | A1 * | 8/2012 | Lyons | G06F 16/345 |
| | | | | 704/9 |
| 2012/0282578 | A1 | 11/2012 | Chapman et al. | |
| 2013/0157245 | A1 * | 6/2013 | Basu | G09B 7/02 |
| | | | | 434/362 |
| 2014/0129542 | A1 * | 5/2014 | Haveliwala | G06F 16/337 |
| | | | | 707/710 |
| 2015/0220630 | A1 * | 8/2015 | Romano | G06F 16/345 |
| | | | | 707/755 |
| 2016/0179759 | A1 * | 6/2016 | Ansari | G06F 16/93 |
| | | | | 715/249 |
| 2016/0275179 | A1 * | 9/2016 | Naqvi | G06F 16/345 |
| 2016/0335346 | A1 * | 11/2016 | Haveliwala | G06F 16/334 |
| 2017/0109633 | A1 * | 4/2017 | Bai | G06N 5/04 |
| 2017/0359393 | A1 * | 12/2017 | Rajagopal | G10L 15/1815 |
| 2018/0144188 | A1 * | 5/2018 | Evanitsky | G06F 16/3322 |
| 2019/0114298 | A1 * | 4/2019 | Acharya | G06F 40/20 |
| 2019/0325084 | A1 * | 10/2019 | Peng | G10L 15/183 |
| 2019/0378076 | A1 * | 12/2019 | O'Gorman | H04M 3/56 |
| 2020/0210521 | A1 * | 7/2020 | Hutchins | G06F 40/221 |
| 2020/0320249 | A1 * | 10/2020 | Hwang | G06N 3/08 |
| 2021/0192141 | A1 * | 6/2021 | Pang | G06N 3/08 |
| 2021/0209121 | A1 * | 7/2021 | Liu | G06F 16/338 |
| 2021/0294829 | A1 * | 9/2021 | Bender | G16H 70/60 |
| 2021/0406296 | A1 * | 12/2021 | Kikin-Gil | G06F 16/387 |
| 2022/0067302 | A1 | 3/2022 | Hayashi et al. | |
| 2022/0084524 | A1 * | 3/2022 | Hou | G06F 16/31 |
| 2022/0318522 | A1 * | 10/2022 | Wolf | G06N 3/044 |
| 2023/0042683 | A1 * | 2/2023 | Tian | G06F 16/3344 |

OTHER PUBLICATIONS

Rui Yan, Jian-Yun Nie, and Xiaoming Li. 2011. Summarize What You Are Interested in: An Optimization Framework for Interactive Personalized Summarization. In Proceedings of the 2011 Conference on Empirical Methods in Natural Language Processing, pp. 1342-1351, ACL (Year: 2011).*

H. Takatsu, M. Okuda, Y. Matsuyama, H. Honda, S. Fujie and T. Kobayashi, "Personalized Extractive Summarization for a News Dialogue System," 2021 IEEE Spoken Language Technology Workshop (SLT), Shenzhen, China, 2021, pp. 1044-1051. (Year: 2021).*

Maâli Mnasri, Gaël de Chalendar, and Olivier Ferret. 2017. Taking into account Inter-sentence Similarity for Update Summarization. In Proceedings of the Eighth International Joint Conference on Natural Language Processing (vol. 2: Short Papers), pp. 204-209, Taipei, Taiwan. (Year: 2017).*

Markus Zopf, Eneldo Loza Mencía, and Johannes Fürnkranz. 2016. Sequential Clustering and Contextual Importance Measures for Incremental Update Summarization. In Proceedings of COLING 2016, the 26th International Conference on Computational Linguistics: Technical Papers, pp. 1071-1082, Osaka, Japan (Year: 2016).*

Alberto Díaz, Pablo Gervas, User-model based personalized summarization, Information Processing & Management, vol. 43, Issue 6, 20 pages. (Year: 2007).*

S. Park and B. Cha, "Query Based Personalized Summarization Agent Using NMF and Relevance Feedback," in Convergence Information Technology, International Conference on, null, 2008 pp. 779-784. (Year: 2008).*

Dang, Hoa & Owczarzak, Karolina. (2008). Overview of the TAC 2008 update summarization task. (Year: 2008).*

Seeger, F. and Roark, B. "Query-focused Supervised Sentence Ranking for Update Summaries." Theory and Applications of Categories (2008): n. pag. (Year: 2008).*

Gambhir, Mahak and Vishal Gupta. "Recent automatic text summarization techniques: a survey." Artificial Intelligence Review 47 (2016): 1-66. (Year: 2016).*

Samira Ghodratnama, Amin Beheshti, Mehrdad Zakershahrak, Fariborz Sobhanmanesh, Intelligent Narrative Summaries: From Indicative to Informative Summarization, Big Data Research, vol. 26, 2021 (Year: 2021).*

Po Hu, Donghong Ji, Chong Teng, and Yujing Guo. 2012. Context-Enhanced Personalized Social Summarization. In Proceedings of COLING 2012, pp. 1223-1238, Mumbai, India. The COLING 2012 Organizing Committee. (Year: 2012).*

H. Kulkarni, T. Joshi, N. Sanap, R. Kalyanpur and M. Marathe, "Personalized Newspaper Based on Emotional Traits Using Machine Learning," 2019 5th International Conference on Computing, Communication, Control and Automation (ICCUBEA), Pune, India, 2019, pp. 1-5. (Year: 2019).*

Aggarwal, et al., "Update Summarization", In Journal of Course Final Project, Standford University, Jun. 5, 2009, 12 Pages.

Ghodratnama, et al., "Adaptive Summaries: A Personalized Concept-based Summarization Approach by Learning from Users' Feedback", In Proceedings of ICSOC Workshops, Dec. 24, 2020, 13 Pages.

Wan, Xiaojun, "Update Summarization Based on Co-Ranking with Constraints", In Proceedings of COLING: Posters, Dec. 1, 2012, pp. 1291-1300.

International Search Report and Written Opinion received for PCT Application No. PCT/US2024/016416, May 10, 2024, 13 pages.

Miculicich, et al., "Document Summarization with Text Segmentation", retrieved from: arxiv logo>cs>arXiv:2210.16422, Jan. 20, 2023, 5 pages.

* cited by examiner

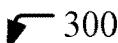

300

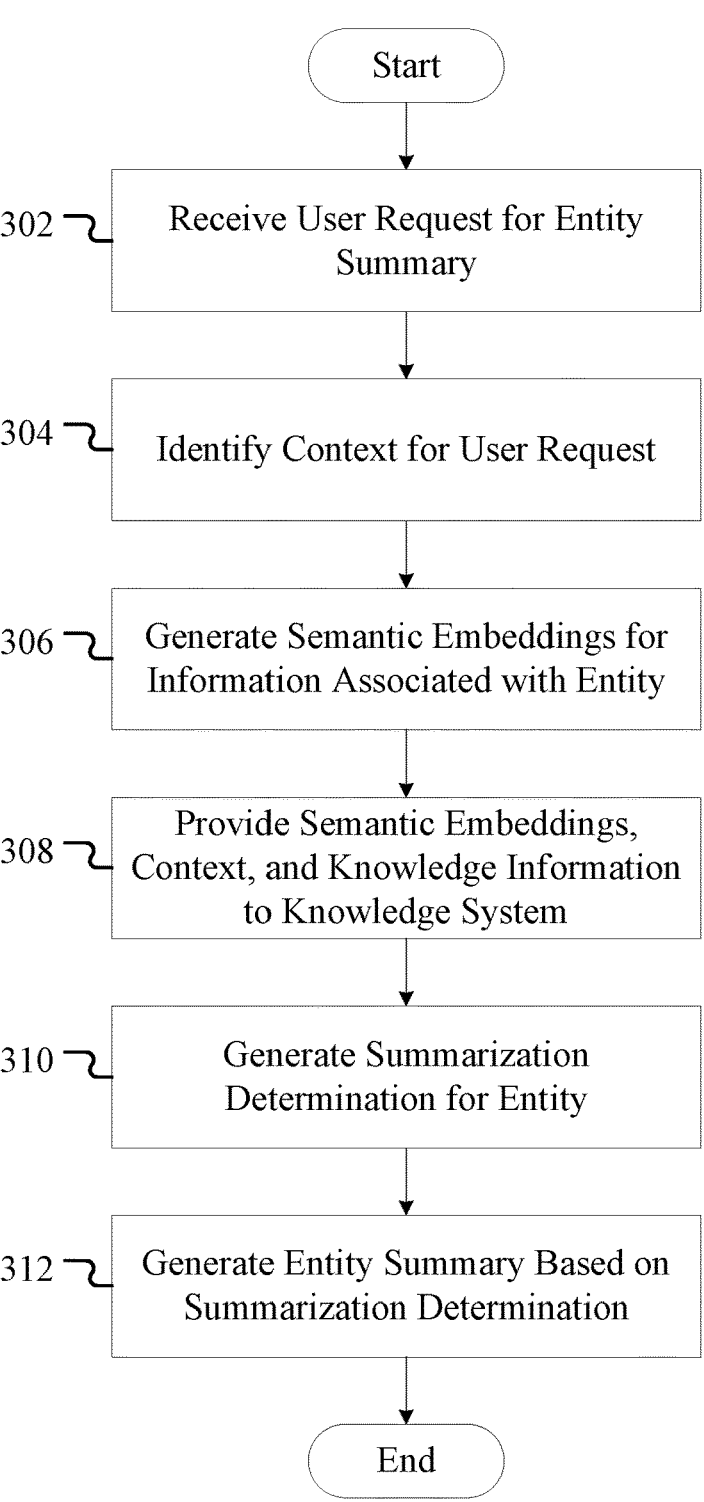

Start

302 — Receive User Request for Entity Summary

304 — Identify Context for User Request

306 — Generate Semantic Embeddings for Information Associated with Entity

308 — Provide Semantic Embeddings, Context, and Knowledge Information to Knowledge System 310 — Generate Summarization Determination for Entity 312 — Generate Entity Summary Based on Summarization Determination End

FIG. 3

TEXTUAL SUMMARIES IN INFORMATION SYSTEMS BASED ON PERSONALIZED PRIOR KNOWLEDGE

BACKGROUND

A document summary provides a user a brief overview of content in the document. In most cases, document summaries are based on the entire document or on a time-relevant portion of the document (e.g., modifications within the last three days). However, such document summaries are often over-inclusive and/or under-inclusive in light of a particular user's knowledge of the topics in the documents and the particular user's recent document access history.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for providing textual summaries based on personalized prior knowledge. In examples, a user's request for a document summary is received at a processing system. The document is separated into segments and semantic embeddings are created for each segment. The semantic embeddings, a context of the user request, and relevant information available in the user's previous knowledge base are provided as input to a personal knowledge system. Based on the input, the personal knowledge system outputs an indication of the segments in the document that should be summarized. The indicated segments are provided to a summarization system, which generates one or more summaries for the document based on the indicated segments and provides the one or more summaries for the document to the user.

In other examples of the present disclosure, a user's request for an entity summary is received at the processing system. Documents and information associated with the entity are identified and separated into segments. Semantic embeddings are created for each segment. The semantic embeddings, a context of the user request, and relevant information available in the user's previous knowledge base are provided as input to the personal knowledge system. Based on the input, the personal knowledge system outputs an indication of the segments in the documents and information that should be summarized. The indicated segments are provided to a summarization system, which generates summaries for the entity based on the indicated segments and provides the summaries for the entity to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

FIG. 3 illustrates a method for providing textual entity summaries based on personalized prior knowledge of a user.

DETAILED DESCRIPTION

Figure 1:
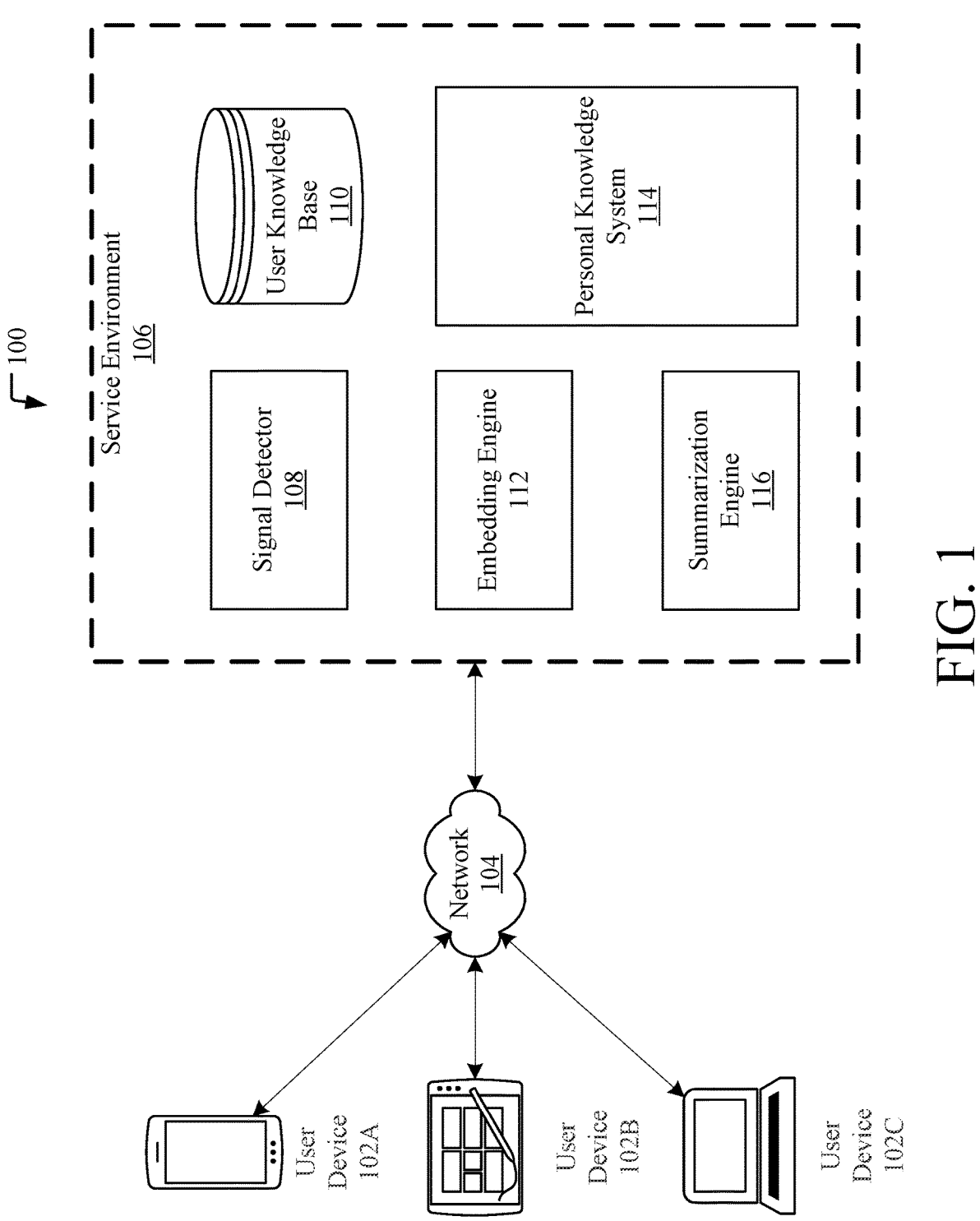
FIG. 1 illustrates an overview of an example system for providing textual summaries based on personalized prior knowledge.

In many systems, document summaries are provided to a user to enable the user to access a brief overview of a document's content prior to opening or requesting the document. As used herein, the term "document" encompasses, among other things, files, electronic communications (e.g., email messages, calendar invites, instant messages, text messages, social media posts, phone call data, and voicemail data), video data, and image data. In some cases, the document summaries are based on the entire document. For instance, a document summary may include a one-sentence summary of each paragraph in the document regardless of the length or complexity of each paragraph. Alternatively, the document summary may summarize detected topics in a document or describe the overall theme of a document. In other cases, the document summaries are based on a time-relevant portion of the document. For instance, a document summary may prioritize modifications to the document that were made within a recent time period (e.g., the last three days) or were made by a particular entity (e.g., user, group, or organization). However, such document summaries are often over-inclusive and/or under-inclusive for most users. For example, users who have extensive or recent knowledge on a topic often find document summaries to be over-inclusive (e.g., to provide information already known to the user), whereas users who have limited or less-recent knowledge on a topic often find document summaries to be under-inclusive (e.g., to omit information that would be helpful to the user).

The present disclosure addresses the above-described problems with document summary technologies by providing a solution that provides textual document summaries and textual entity summaries based on the personalized prior knowledge of a user. In embodiments of the present disclosure, a user request for a summary of a document or a summary of an entity is received at an information processing system. For instance, a user may specifically request a summary (e.g., via selecting a "Summary" button/option or entering a voice command for a summary). In other examples, the user request is implicit. For instance, a user may access a document in a content feed or while browsing; a user may receive an electronic communication that includes attached documents, refers to relevant documents, or identifies another user (e.g., a sender, another recipient, or a relevant user); a user may perform a hover event (or other interaction events) in association with a document, an entity, or a corresponding link; or a user may compose an electronic communication to one or more recipients. In this example, each event (e.g., document access, electronic communication send/receive, or interaction event) may be interpreted as an implicit request for a summary for a corresponding document or entity.

Upon receiving the user request for the summary, a context for the user request is identified. The context may be based on information or settings associated with the user, the document, the user's device, and/or members of the user's social circle. Non-exhaustive examples of information included in the context include the user's average reading speed, the maximum amount of time the user has to read a document summary, previous summary consumption information (e.g., the average attention time spent by the user for similar topics, at similar times of the day or week, or in similar locations), the user's current location, the user's mode of travel, the length of the document, the number of words or sentences in the document, the complexity of the document (e.g., structural, semantic, or comprehension complexity), the topics in the document, whether a user preference regarding new information or information retention has been expressed, whether a user preference regarding document summary length or scope has been expressed, whether a user preference towards displaying or describing images and/or video has been expressed, information/capabilities of the user's device (e.g., make/model, hardware/software version, display screen size or resolution, and touch screen capability), the identity or role of members of the user's social circle, the user's communication behavior (e.g., communication frequency, communication length, and communication topics) with other users, commonalities between users, and one or more events (e.g., previous, current, or upcoming events).

If the received user request is for a summary of a document, the document is separated into multiple segments. In examples, each segment corresponds to a section, a paragraph, a sentence, an image, or another document object of the document. A semantic embedding is generated for each segment. A semantic embedding, as used herein, refers to a representation of a segment that is created by converting high-dimensional data to low-dimensional data in such a manner that the high-dimensional data and the low-dimensional data are semantically similar. In one example, each semantic embedding is represented as a feature vector (e.g., an n-dimensional vector of numerical features that represents one or more objects).

If the received user request is for a summary of an entity, information relating to the entity is collected from one or more data stores. Non-exhaustive examples of information relating to the entity include documents associated with the entity, public news and events associated with the entity, social circle information of the entity, mailing lists including the entity, role or title information for the entity, project information associated with the entity, social media information of the entity, and user signals (e.g., detected events) associated with the entity. In some examples, semantic embeddings are generated for the information relating to the entity.

The semantic embeddings, the context for the user request, and information associated with an existing knowledge base of the user are provided as input to a personal knowledge system that is personalized for the user. Non-exhaustive examples of information associated with an existing knowledge base of a user include the user's areas of interest or expertise, the level of the user's interest or knowledge in various knowledge areas or with various documents, documents interactions by the user (e.g., documents or sections of documents the user authored, read, modified, commented on, received, sent, or referred to), electronic communications of the user, text or voice data from meetings and events attended by the user, video and image data associated with the user or interacted with by the user, and other user signals (e.g., detected events) associated with the user. Based on the input, the personal knowledge system outputs indications of the semantic embeddings that are to be summarized for the user. In examples, the indications are ranked in order of importance to the user. The indications may also indicate a summarization scope for each semantic embedding or an amount by which the information associated with each semantic embedding should be summarized.

The indications of the semantic embeddings are used to generate summaries for the information associated with the semantic embeddings. As one example, a document may be summarized such that information that is already known to the user or that is not of interest to the user is omitted or summarized briefly at a high conceptual level, whereas information that is not known to by user or that is of interest to the user is summarized more comprehensively at a conceptual level that is in accordance with the user's knowledge level on the information. As another example, a summarization for an entity is generated such that entity information that is interesting to the user, temporally relevant (e.g., upcoming meetings or visit dates), or particularly noteworthy (e.g., significant achievements, events with significant public reach, or anniversaries) are prioritized (e.g., ranked accordingly). In such examples, presentation of the summaries may be based on the context of the user request. For instance, the context may influence the length of summaries, highlighting or emphasis applied to summaries, an output mode for summaries (e.g., delivered on-screen as text or delivered as speech by a digital assistant), a presentation order of summaries, or whether additional (e.g., supplemental) information is provided along with summaries.

As such, the present disclosure provides a plurality of technical benefits and improvements over previous document summary solutions. These technical benefits and improvements include, among other, using the personalized prior knowledge of a user to determine the applicable scope and complexity of document summaries to generate for the user, using the personalized prior knowledge of a user to generate entity summaries for the user, and using the context of a user request to determine an optimal presentation length and format for summaries.

FIG. 1 illustrates an overview of an example system for providing textual summaries based on personalized prior knowledge. The example system may correspond to an enterprise system that comprises one or more entities, stores multiple documents that are specific to or owned by the one or more entities, and has access to multiple documents that are external to the boundary of the enterprise system (e.g., public documents or documents of other enterprise systems). System 100, as presented, is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein are implemented on a single computing device. In another example, components of systems disclosed herein are distributed across multiple computing devices and/or computing environments.

In FIG. 1, system 100 comprises user devices 102A, 102B, and 102C (collectively "user device(s) 102"), network 104, and service environment 106. Although FIG. 1 is depicted as comprising a particular combination of computing environments and devices, the scale and structure of devices and computing environments described herein may vary and may include additional or fewer components than those described in FIG. 1. Further, although examples in FIG. 1 and subsequent figures will be described in the context of personalized textual summarization for document and entities, the examples are equally applicable to summarization that is based on the existing knowledge of multiple users, summarization for events (and other types of activities), and summarization provided in non-textual formats (e.g., speech-based formats or video-based formats).

User device(s) 102 are configured to detect and/or collect input data from one or more users or user devices. In some examples, the input data corresponds to user interaction with one or more software applications or services implemented by, or accessible to, user device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of user activity corresponding to a task, a project, a data request, or the like. The input data includes, for example, audio input, touch input, text-based input, gesture input, image input, and/or corresponding user signals. The input data is detected and/or collected using one or more sensor components of user device(s) 102, such as keyboards, microphones, pointing/selection tools, touch-based sensors, optical/magnetic sensors, geolocation sensors, and accelerometers. Examples of user device(s) 102 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices, and Internet of Things (IoT) devices.

User device(s) 102 may comprise or otherwise have access to various applications and services. Non-exhaustive examples of applications include word processing applications, spreadsheet application, presentation applications, document-reader software, social media software/platforms, search engines, media software/platforms, multimedia player software, content design software/tools, and database applications. The applications and services enable users to access and/or interact with one or more types of content, such as text, audio, images, video, animation, and multimedia (e.g., a combination of text, audio, images, video, and/or animation).

User device(s) 102 provide received input data to service environment 106. In some examples, user device(s) 102 use network 104 to transmit the input data to service environment 106. Examples of network 104 include a private area network (PAN), a local area network (LAN), a wide area network (WAN), and the like. Although network 104 is depicted as a single network, it is contemplated that network 104 may represent several networks of similar or varying types. In other examples, the input data is provided to service environment 106 without using network 104.

Service environment 106 provides user device(s) 102 access to various computing services and resources (e.g., applications, devices, storage, processing power, networking, analytics, intelligence). In some examples, service environment 106 is implemented in a cloud-based or server-based environment using one or more computing devices, such as server devices (e.g., web servers, file servers, application servers, database servers), edge computing devices (e.g., routers, switches, firewalls, multiplexers), personal computers (PCs), virtual devices, and mobile devices. In other examples, service environment 106 is implemented in an on-premises environment (e.g., a home or an office) using such computing devices. The computing devices may comprise one or more sensor components, as discussed with respect to user device(s) 102. In yet other examples, service environment 106 is implemented locally on user device(s) 102. Service environment 106 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)).

In FIG. 1, service environment 106 comprises signal detector 108, user knowledge base 110, embedding engine 112, personal knowledge system 114, and summarization engine 116. Signal detector 108 detects or receives user signals associated with input data generated by user device(s) 102. Signal detector 108 may detect the user signals using an event listener function or procedure (or similar functionality). The listener function or procedure is programmed to react to an input or signal indicating the occurrence of a specific event by calling an event handler. In examples, at least a portion of the user signals generated by user device(s) 102 relate to user requests (e.g., implicit user requests or explicit user requests) for summaries of documents and/or entities. For instance, a user of user device(s) 102 may execute a search query that generates search results comprising a set of documents. Performing the search query may be considered an implicit user request to generate summaries for one or more documents in the search results.

In some examples, signal detector 108 identifies a context of a detected user request for summaries. In other examples, the context is identified by an alternative component of system 100. The context may be based on information associated with the user, a document (or set of documents), the user's device, or another entity. Such information is based on current user behavior or location, previous user behavior, user preferences or settings configured for the user, or a stated user objective for a user request. As one example, signal detector 108 may determine that a context for a user that has submitted a user request for a summary of a document indicates: the user is currently commuting to a destination, the user will arrive at that destination in approximately ten minutes, the user is an expert on several topics in the document, the average reading speed for the document, the average reading speed of the user, and the type of device from which the user signals were received. The context may further indicate that the user typically focuses attention on each summary for approximately thirty seconds, the user typically focuses attention on the first portion of a summary (e.g., the first fifty percent of the lines in the summary), the user has expressed an interest in learning about one or more particular topics, and the user typically prefers receiving a low conceptual level of summarization for topics in which the user is not an expert.

User knowledge base 110 stores user data relating to previously collected user signals and existing user knowledge of a user (collectively referred to as "knowledge data"). User knowledge base 110 may represent or be stored in a data store, such as a database, a table, or a similar storage device or system. User knowledge base 110 aggregates user data from various data sources (e.g., signal detector 108, the user's application data, data stores external to system 100) and stores the aggregated user data in one or more data structures. As one example, knowledge base 110 comprises a personalized knowledge graph (or any other type of ontologically based data structure) for each user that is a member of system 100. In this example, the personalized knowledge graph comprises objects (e.g., documents, document parts, entities) interacted with by the user, relationships between the objects, and metadata associated with the objects and relationships (e.g., creation date, modification date, most recent interaction date, document properties, and entity properties). The personalized knowledge graph may also comprise weights or scores that are assigned to the objects based on various factors, such as the date/time the object was added to the personalized knowledge graph, the user's expertise or familiarity with the object, the user's interest in the object, the most recent modification of the object, the frequency of the user's interaction with the object, the total number of user interactions with the object, the user's most recent interaction with the object, the type of interaction(s) with the object, and so on.

Embedding engine 112 retrieves a document or object from a data source, such as user device(s) 102, user knowledge base 110, or another data repository of system 100. In some examples, the document or object is in a format other than a textual format, such as an audio format or a video format. In such examples, embedding engine 112 may convert the audio data or an audio portion of the video data into textual format. Embedding engine 112 separates the document or object into one or more segments using, for example, a data parsing utility. A semantic embedding is then generated for each of the segments using an embedding model, such as Bidirectional Encoder Representations of Transformers (BERT), Sentence BERT (SBERT), Principal Component Analysis (PCA), Singular Value Decomposition (SVD), and Word2Vec. In examples, the embedding model factorizes a segment into one or more feature vectors.

Personal knowledge system 114 identifies semantic embeddings to be summarized. In examples, personal knowledge system 114 is a machine learning (ML) system that is personalized (e.g., trained) for a user using information in or relating to user knowledge base 110 and/or other user-specific data of the user. Non-exhaustive examples of ML techniques implemented by personal knowledge system 114 include neural networks (e.g., generative adversarial networks (GANs), recurrent neural networks (RNNs), convolutional neural networks (CNNs), and autoencoders), ensemble methods (e.g., random forests and gradient boosting), classification models (e.g., support vector machines (SVMs), k-nearest neighbor models, and decision trees), and regression models (e.g., linear regression models and logistic regression models).

Personal knowledge system 114 receives input in the form of semantic embeddings from signal detector 108, a user request context from signal detector 108 (or from an alternative component of system 100), and/or knowledge information from user knowledge base 110. In examples, personal knowledge system 114 compares the semantic embeddings to the knowledge information. The comparison may include dynamically (e.g., in response to detecting the user request) creating semantic embeddings for the knowledge information. Alternatively, previously generated semantic embeddings may be stored in the knowledge information. In some examples, the comparison is performed by calculating a similarity measurement between semantic embeddings and knowledge information, such as a cosine similarity measurement or a Euclidian distance measurement. The similarity measurement indicates the similarity in content or topic between a semantic embedding and the knowledge information. In other examples, the comparison is performed using a statistical technique, such as maximum mean discrepancy (MMD). MMD represents distances between distributions as distances between mean embeddings of features.

The results of comparing the semantic embeddings to the knowledge information are evaluated based on the context for the user request. For example, based on the context for the user request, personal knowledge system 114 may prioritize summarizing semantic embeddings that include new information relating to topics with which the user has expertise or experience, new information relating to topics with which the user has limited knowledge or experience, or known information (e.g., information known by the user) relating to topics with which the user has expertise or extensive experience. Based on evaluation of the comparison, personal knowledge system 114 identifies semantic embeddings that are to be summarized for the user that submitted the user request. Identifying the semantic embeddings may include generating an indication for each semantic embedding, such as a unique identifier (e.g., an index value or a hash value). Alternatively, identifying the semantic embeddings may include collecting the semantic embeddings or the segments corresponding to the semantic embeddings.

Personal knowledge system 114 also determines a summarization scope for each semantic embedding or an amount by which the information associated with each semantic embedding should be summarized, based on the context for the user request. For example, personal knowledge system 114 may determine that semantic embeddings relating to a particular topic are to be summarized at a high conceptual level (or a low conceptual level), semantic embeddings are to be limited to a particular number of sentences or words, or semantic embeddings are to include supplemental information (e.g., links to additional content). Personal knowledge system 114 also determines, based on the context for the user request, a presentation order and/or an output mode for the semantic embeddings. As one example, personal knowledge system 114 may assign an order to semantic embeddings such that the segments having the highest or lowest similarity measurements are presented prior to other segments. As another example, personal knowledge system 114 may determine that the semantic embeddings are to be delivered via speech or text based on the current transportation mode or activity of the user.

Summarization engine 116 receives indications of semantic embeddings to be summarized and corresponding summarization instructions (e.g., summarization scope summarization amount, presentation order, output mode) from personal knowledge system 114. In examples, summarization engine 116 implements an ML language model that generates human-like text from semantic embeddings, such as Generative Pre-trained Transformer 3 (GPT-3), Language Model from Dialogue Applications (LaMDA), and Big-Science Large Open-science Open-access Multilingual language model (BLOOM). Summarization engine 116 generates one or more summaries for the semantic embeddings in accordance with the summarization instructions. For example, a summary may comprise segments that have various summarization scopes and that are arranged in a particular segment presentation order. Summarization engine 116 provides summaries to user device(s) 102 to fulfill user requests for the summaries. For instance, a summary may be provided to one or more user device(s) 102 of a user that submitted the user request. The summary may then be displayed on or by user device(s) 102 in response to the user request.

Having described a system that may be employed by the embodiments disclosed herein, methods that may be performed by such a system are now provided. Although methods 200-300 are described in the context of system 100, the performance of methods 200-300 are not limited to such examples.

Figure 2:
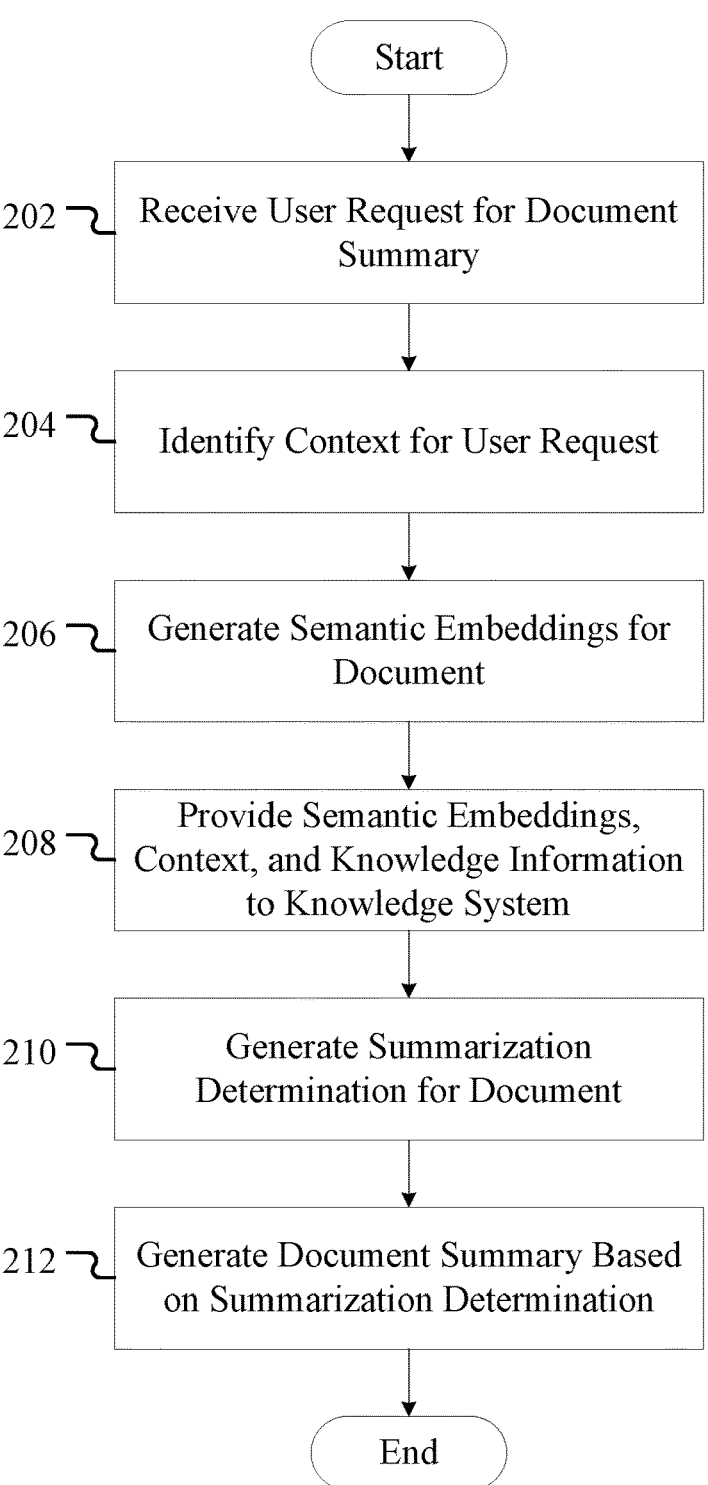
FIG. 2 illustrates a method for providing textual document summaries based on personalized prior knowledge of a user.

FIG. 2 illustrates a method 200 for providing textual document summaries based on personalized prior knowledge of a user. Method 200 may be performed by one or more components of a computing environment, such as service environment 106. Method 200 begins at operation 202, where a user request for a document summary is received. In examples, the user request is determined by a user signal monitoring mechanism, such as signal detector 108, in response to detecting user signals by a user device, such as user device(s) 102. The user signals may correspond to an explicit request by a user to retrieve a document summary or an implicit request by a user to retrieve a document summary. As one example, in response to a user performing a hovering event on a hyperlink or an icon for a document, the signal monitoring mechanism receives or creates a set of commands (e.g., computing instructions) for generating a summary for the document.

At operation 204, a context for the user request is identified. In examples, the context for the user request is identified using information associated with the user that submitted the user request (e.g., behavioral tendencies, configuration settings/user preferences, and user knowledge objectives), information associated with the user device of the user (e.g., geographical location data, destination data, and user device capabilities), and information associated with the document for which the document summary was requested (e.g., required or average reading time, reading complexity, and the topics discussed in the document). Such information may be collected from data sources stored in the computing environment and/or the user device, such as a user profile, event logs, application data, device sensor data, the document, and a data store comprising metadata or an index of the document.

At operation 206, semantic embeddings are generated for the document for which the document summary was requested. In examples, the document (or a copy of the document) is retrieved or accessed from a data source (e.g., the user device or any other data store accessible to the computing environment). For instance, an identifier of the document (e.g., document name, uniform resource locator (URL), or uniform resource name (URN)) is requested from the user device or identified from the context for the user request. The identifier is used to locate or access the document. A segmenting mechanism, such as embedding engine 112, separates the document into one or more segments (e.g., sections, paragraphs, sentences, or document objects). A semantic embedding is generated for each of the segments of the document. In examples, each semantic embedding represents a feature vector that comprises semantic information for a corresponding segment. The feature vector may comprise numerical values representing the semantic information.

At operation 208, the semantic embeddings for the document and the context for the user request are provided to a knowledge system that has been personalized for the user, such as personal knowledge system 114. In some examples, the knowledge system also receives knowledge information for the user that submitted the user request. The knowledge information comprises previously collected user signals and existing user knowledge of the user. The knowledge information is retrieved from a data store, such as user knowledge base 110. The knowledge system compares the semantic embeddings to the knowledge information to determine similarities (or dissimilarities) between the semantic embeddings and the knowledge information. The similarities (or dissimilarities) identify whether the user is knowledgeable regarding or has previous experience with the information (e.g., topics or facts) represented by a semantic embedding. As one example, if a semantic embedding is generated for a topic for which the user is an expert, the comparison by the knowledge system will indicate a close similarity (or match) between the semantic embedding and the knowledge information.

At operation 210, a summarization determination is generated for the document. In examples, the knowledge system evaluates the similarities (or dissimilarities) between the semantic embeddings and the knowledge information in accordance with the context for the user request to determine a summarization scope for the document summary. The summarization scope identifies the information in each semantic embedding that should be summarized and the amount by the which the information should be summarized. As one example, the summarization scope may indicate that a topic for which the user is an expert should be summarized at a high conceptual level using a single sentence of no more than twenty words, whereas a topic for which the user has limited knowledge expert should be summarized at a low conceptual level using multiple sentences collectively including no more than five hundred words. The knowledge system also determines presentation options (e.g., segment presentation order and document summary output mode) for the document summary based on the context for the user request. As one example, for a user that is currently attending an in-person meeting according to the user's calendar events (identified by the context for the user request), the document summary may be arranged such that topics in the document that are relevant to topics in the meeting are provided at the top (e.g., beginning) of the document summary and are presented with emphasis (e.g., highlighted, bolded, or italicized). The summarization determination comprises the summarization scope and the presentation options.

At operation 212, a document summary is generated for the document. In examples, the summarization determination is provided to a summary generation mechanism, such as summarization engine 116. The summary generation mechanism generates a textual document summary for the document based on the summarization determination. In some examples, the summary generation mechanism retrieves or accesses the document, as discussed above at operation 206. The summarization determination is then applied to the document to generate the document summary. For instance, the summarization determination may include summarization instructions (e.g., computing instructions) for converting the document into the document summary. In other examples, the document summary is generated using the semantic embeddings and the summarization determination. For instance, the summarization determination may be applied to the segment corresponding to each semantic embedding. Alternatively, the summarization determination may be used to generate modified semantic embeddings that are used to recreate corresponding modified segments. The modified segments are then used to generate the document summary. After the document summary has been generated, the document summary is provided to the user in fulfillment of the user request.

FIG. 3 illustrates a method 300 for providing textual entity summaries based on personalized prior knowledge of a user. Method 300 may be performed by one or more components of a computing environment, such as service environment 106. Method 300 begins at operation 302, where a user request for an entity summary is received. In examples, the user request is determined as described at operation 202 of FIG. 2. For instance, in response to a user receiving an introductory email message from an unknown entity (e.g., an entity with which the user has not previously exchanged electronic communications), a set of commands for generating a summary for the entity is received or created.

At operation 304, a context for the user request is identified. In examples, the context for the user request is identified using information associated with the user that submitted the user request, information associated with a user device of the user, and information associated with the entity for which the entity summary was requested (e.g., biographical data for the entity, documents and projects associated with the entity, public news and events associated with the entity, social media information of the entity, and user signals associated with the entity). Such information may be collected from data sources internal to the computing environment (e.g., user profiles, knowledge graphs, event logs, application data, device sensor data, and electronic communications) and data sources external to the computing environment (e.g., public documents, search engines, or a separate computing environment of the entity).

At operation 306, semantic embeddings are generated for the information associated with the entity. In examples, the information associated with the entity is provided to a segmenting mechanism, such as embedding engine 112. The segmenting mechanism separates the information associated with the entity into segments, as described at operation 206 of FIG. 2. For instance, the entity's resume, recent (e.g., last three months) social media postings, calendar events, and knowledge graph are each separated into respective segments. Semantic embeddings are then generated for each segment. In some examples, prior to separating the information associated with the entity into segments, the segmenting mechanism determines an importance of each content item (e.g., document, image, calendar event, electronic communication) in the information associated with the entity. The importance of each content item may be based on, for example, the creation date or modification date of the content item, the amount of data in the content item, the interest level of the user in each content item (e.g., an explicit or implicit indication by the user), and/or the impact of the content item (e.g., the audience reach of the content item). The importance of each content item may be expressed using an importance value, such as a numerical value (e.g., 90 out of 100) or as a text-based value (e.g., "low importance," "medium importance," or "high importance"). The segmenting mechanism may then assign the importance value to the content item. Alternatively, the content items may include a preexisting importance value. In either scenario, the segmenting mechanism determines whether to separate a content item into segments based on the importance value. For instance, a content item is separated into segments if the importance value for the content item is above a predefined threshold value.

At operation 308, the semantic embeddings for the entity and the context for the user request are provided to a knowledge system that has been personalized for the user, such as personal knowledge system 114. In some examples, the knowledge system also receives knowledge information for the user that submitted the user request and compares the semantic embeddings to the knowledge information, as described at operation 208 of FIG. 2. The similarities (or dissimilarities) between the semantic embeddings and the knowledge information identify whether the user is knowledgeable regarding or has previous experience with the entity or information (e.g., topics or facts) represented by a semantic embedding for the entity.

At operation 310, a summarization determination is generated for the entity. In examples, the knowledge system evaluates the similarities (or dissimilarities) between the semantic embeddings and the knowledge information in accordance with the context for the user request to determine a summarization scope for the entity summary. The summarization scope identifies the information in each semantic embedding that should be summarized and the amount by the which the information should be summarized. As one example, the summarization scope may indicate that the user and the entity share a mutual acquaintance that is a close friend of the user. As such, the summarization scope may indicate that a summary of the mutual acquaintance should be extremely brief (e.g., no more than ten words) or omitted. As another example, the summarization scope may indicate that the entity will be speaking at a conference on a topic in which the user has limited or no knowledge. As such, the summarization scope may summarize the topic at a low conceptual level that includes exploded acronyms, definitions of various terms, and/or links to additional explanatory references. The knowledge system also determines presentation options for the entity summary based on the context for the user request, as described at operation 210 of FIG. 2.

At operation 312, an entity summary is generated for the document. In examples, the summarization determination is provided to a summary generation mechanism, such as summarization engine 116. The summary generation mechanism generates a textual entity summary for the entity based on the summarization determination. For instance, the entity summary may be a report that organizes the segments corresponding to the semantic embeddings into various categories, such as biographical facts for the entity, commonalities and/or dissimilarities between the user and entity, recommended talking points, and so on. In some examples, the entity summary comprises one or more images of the entity and/or of other entities associated with the entity. For instance, the entity summary may comprise an organizational chart comprising images of and information about the entity and the entity's team (e.g., direct reports, peers, and manager). The entity summary may also comprise social media images and information relating to the user. In some examples, the entity summary comprises or provides an actionable task associated with the entity. For instance, the entity summary may comprise a link to register for an event that the entity will be attending. Alternatively, the entity summary may cause an email service to provide a preformatted email that includes the entity's contact information and/or autogenerated text that is relevant to one or more content items in the information associated with the entity.

Figure 4:
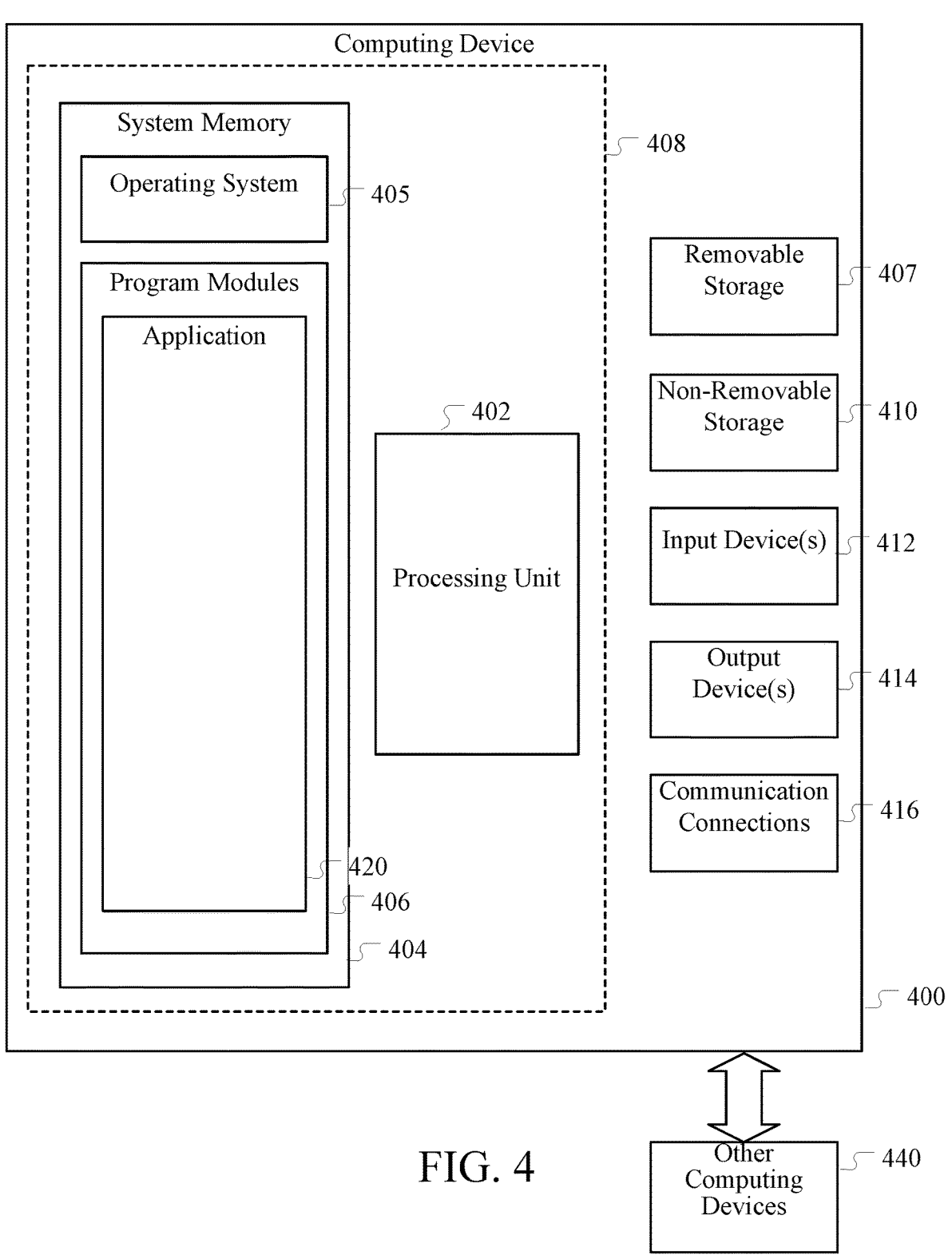
FIG. 4 is a block diagram illustrating example physical components of a computing device for practicing aspects of the disclosure.
Figure 5:
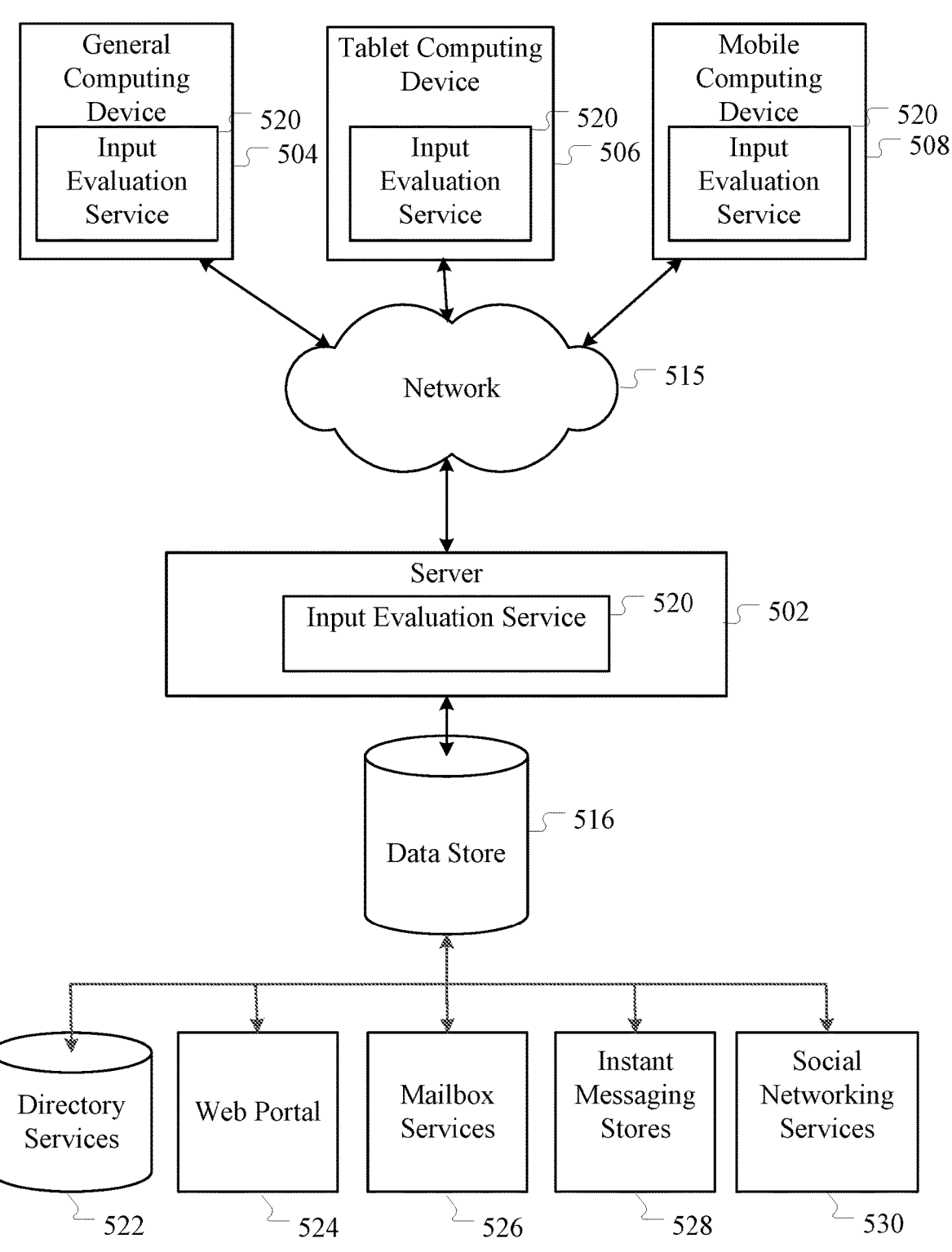
FIG. 5 is a simplified block diagram of an example distributed computing system for practicing aspects of the present disclosure.

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration, and, as is understood, a vast number of computing device configurations may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing unit 402 and a system memory 404. Depending on the configuration and type of computing device, the system memory 404 may comprise volatile storage (e.g., random access memory (RAM)), non-volatile storage (e.g., read-only memory (ROM)), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, or optical disks. Such additional storage is illustrated in FIG. 4 by a removable storage device 407 and a non-removable storage device 410.

As stated above, a number of program modules and data files may be stored in the system memory 404. While executing on the processing unit 402, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

An input evaluation service 520 may be employed by a client that communicates with server device 502, and/or input evaluation service 520 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

As will be understood from the foregoing disclosure, one example of the present disclosure relates to a system comprising: a processor; and memory coupled to the processor, the memory comprising computer executable instructions that, when executed by the processor, perform operations.

The operations comprise: receiving, from a user, a user request for a summary of a document; identifying a context for the user request; separating the document into segments; generating semantic embeddings for the segments; providing the semantic embeddings and the context to a knowledge system that is personalized for the user; generating, by the knowledge system, a summarization determination for the document based on the semantic embeddings and the context; generating the summary of the document based on the summarization determination; and providing the summary of the document to the user.

Another example of the present disclosure relates to a computer-implemented method. The method comprises: receiving, from a user, a user request for a summary of a document; identifying a context for the user request; separating the document into segments; generating semantic embeddings for the segments; providing the semantic embeddings and the context to a knowledge system that is personalized for the user; generating, by the knowledge system, a summarization determination for the document based on the semantic embeddings and the context; generating the summary of the document based on the summarization determination; and providing the summary of the document to the user.

Another example of the present disclosure relates to a computing environment comprising: a processor; and memory coupled to the processor, the memory comprising computer executable instructions that, when executed by the processor, perform operations. The operations comprise: receiving, from a user, a user request for a summary of a document; identifying a context for the user request; generating semantic embeddings for the document; providing, to a knowledge system, the semantic embeddings, the context, and knowledge information for the user, the knowledge information identifying a level of knowledge of the user for one or more areas of knowledge; generating, by the knowledge system, a summarization determination for the document based on the semantic embeddings, the context, and the knowledge information; generating the summary of the document based on the summarization determination; and providing the summary of the document to the user.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing unit; and
memory coupled to the processing unit, the memory comprising computer executable instructions that, when executed, perform operations comprising:
receiving, from a user, a user request for a summary of a document;
identifying a context for the user request, the context comprising at least one of:
reading speed of the user; or
a determined amount of current availability for the user;
separating the document into segments;
generating semantic embeddings for the segments;
providing the semantic embeddings and the context to a knowledge system that is personalized for the user;
comparing each of the semantic embeddings to knowledge information for the user to determine a knowledge level of the user with topics represented by content in each of the semantic embeddings, wherein the knowledge level is based on a degree of similarity between the semantic embeddings and the knowledge information, wherein the knowledge information comprises:
objects interacted with by the user;
relationships between the objects; and
metadata associated with the objects and the relationships;
generating, by the knowledge system, a summarization determination for the document based on the context and the knowledge level of the user with the topics, wherein the summarization determination identifies which of the content in each of the semantic embeddings is to be summarized and an amount by which the content in each of the semantic embeddings is to be summarized, and wherein the summarization determination comprises computer instructions for converting the document into the summary of the document;
applying a presentation option to the summarization determination based on the context, wherein the presentation option prioritizes presentation of the topics based on the knowledge level of the user with the topics;
generating the summary of the document based on the summarization determination and the presentation option; and
providing the summary of the document to the user.

2. The system of claim 1, wherein the user request is an implicit user request that is determined based on user signals received from a user device of the user.

3. The system of claim 2, wherein the implicit user request corresponds to:
receiving the document via an electronic communication;
receiving a semantic reference to the document; or
a hover event on a link or an icon of the document.

4. The system of claim 1, wherein the context for the user request is identified using information associated with the user and at least one of:
information associated with a user device of the user; or
information associated with the document.

5. The system of claim 4, wherein the information associated with the user comprises at least one of:

behavioral tendencies of the user;

configuration settings or user preferences associated with the user; or knowledge objectives indicated by the user.

6. The system of claim 4, wherein the information associated with the user device of the user comprises at least one of:

geographical location data for the user;

destination data for the user; or capabilities of the user device.

7. The system of claim 4, wherein the information associated with the document comprises at least one of:

an average reading time for the document;

a reading complexity of the document; or topics discussed in the document.

8. The system of claim 4, wherein:

the system is an enterprise system, the user being a member of the enterprise system; and the context is identified using data sources of the enterprise system.

9. The system of claim 1, wherein the segments correspond to:

sections of the document;

paragraphs of the document; or sentences of the document.

10. The system of claim 1, wherein the semantic embeddings represent feature vectors that comprises semantic information for a corresponding segment.

11. The system of claim 1, wherein the knowledge information for the user is provided to the knowledge system as part of providing the semantic embeddings and the context to the knowledge system.

12. The system of claim 11, wherein the knowledge information further comprises at least one of:

previously collected user signals for the user; or existing user knowledge of the user.

13. The system of claim 11, wherein the knowledge system compares the semantic embeddings to the knowledge information to determine similarities between the semantic embeddings and the knowledge information.

14. The system of claim 13, wherein the similarities between the semantic embeddings and the knowledge information indicate whether the user is knowledgeable regarding topics or facts represented by the semantic embeddings.

15. A method comprising:

receiving, from a user, a user request for a summary of a document;

identifying a context for the user request, the context comprising at least one of:

reading speed of the user; or a determined amount of current availability for the user;

separating the document into segments;

generating semantic embeddings for the segments;

providing the semantic embeddings and the context to a knowledge system that is personalized for the user;

comparing each of the semantic embeddings to knowledge information for the user to determine a knowledge level of the user with topics represented by content in each of the semantic embeddings, wherein the knowledge information comprises:

objects interacted with by the user;

relationships between the objects; and metadata associated with the objects and the relationships;

generating, by the knowledge system, a summarization determination for the document based on the context and the knowledge level of the user with the topics, wherein the summarization determination identifies which of the content in each of the semantic embeddings is to be summarized and an amount by which the content in each of the semantic embeddings is to be summarized, and wherein the summarization determination comprises computer instructions for converting the document into the summary of the document;

generating the summary of the document based on the summarization determination; and providing the summary of the document to the user.

16. The method of claim 15, wherein generating the summarization determination comprises:

determining a summarization scope for the summary of the document, the summarization scope indicating that summary information for at least a portion of the semantic embeddings is to be omitted from the summary of the document.

17. The method of claim 16, wherein generating the summarization determination further comprises:

determining presentation options for the summary of the document, the presentation options indicating at least one of:

a presentation order for the segments; or an output mode for the summary of the document.

18. The method of claim 15, wherein generating the summary of the document comprises:

identifying the segments corresponding to the semantic embeddings;

applying the summarization determination to the segments to generate modified segments; and using the modified segments to generate the summary of the document.

19. The method of claim 15, wherein generating the summary of the document comprises:

accessing the document or a copy of the document; and applying the summarization determination to the document or the copy of the document, wherein the summarization determination includes instructions for converting the document or the copy of the document into the summary of the document.

20. A computing environment comprising:

a processing unit; and memory coupled to the processing unit, the memory comprising computer executable instructions that, when executed, perform operations comprising:

receiving, from a user, a user request for a summary of a document, wherein the document comprises content on one or more topic areas;

identifying a context for the user request, wherein the context is based on at least one of:

reading speed of the user; or a determined amount of current availability for the user;

generating semantic embeddings for the document;

providing, to a knowledge system, the semantic embeddings, the context, and knowledge information for the user, the knowledge information identifying a level of knowledge of the user for one or more areas of knowledge;

comparing each of the semantic embeddings to knowledge information for the user to determine a knowledge level of the user with topics represented by content in each of the semantic embeddings, wherein the knowledge information comprises:

objects interacted with by the user;

relationships between the objects; and metadata associated with the objects and relation-
   ships;
generating, by the knowledge system, a summarization
   determination for the document based on the context
   and the knowledge level of the user with the topics,
   wherein the summarization determination identifies
   which of the content in each of the semantic embed-
   dings is to be summarized and an amount by which
   the content in each of the semantic embeddings is to
   be summarized, and wherein the summarization
   determination comprises computer instructions for
   converting the document into the summary of the
   document;
applying a presentation option to the summarization
   determination based on the context;
generating the summary of the document based on the
   summarization determination and the presentation
   option; and
providing the summary of the document to the user.

* * * * *